US008866821B2

(12) United States Patent
Finocchio

(10) Patent No.: US 8,866,821 B2
(45) Date of Patent: Oct. 21, 2014

(54) DEPTH MAP MOVEMENT TRACKING VIA OPTICAL FLOW AND VELOCITY PREDICTION

(75) Inventor: Mark J. Finocchio, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 631 days.

(21) Appl. No.: 12/363,036

(22) Filed: Jan. 30, 2009

(65) Prior Publication Data
US 2010/0194741 A1    Aug. 5, 2010

(51) Int. Cl.
*G06K 9/00* (2006.01)
*G06T 7/20* (2006.01)

(52) U.S. Cl.
CPC ..... *G06T 7/2066* (2013.01); *G06T 2207/10028* (2013.01)
USPC ........... 345/473; 345/419; 345/420; 382/103; 382/107; 382/106

(58) Field of Classification Search
USPC ........................................ 345/473
See application file for complete search history.

(56) References Cited

U.S. PATENT DOCUMENTS

| | | | |
|---|---|---|---|
| 5,627,905 A | 5/1997 | Sebok | |
| 6,057,909 A | 5/2000 | Yahav et al. | |
| 6,100,517 A | 8/2000 | Yahav et al. | |
| 6,192,156 B1 | 2/2001 | Moorby | |
| 6,256,033 B1 | 7/2001 | Nguyen | |
| 6,498,628 B2 | 12/2002 | Iwamura | |
| 6,502,515 B2 | 1/2003 | Burckhardt et al. | |
| 6,539,931 B2 | 4/2003 | Trajkovic et al. | |
| 6,674,877 B1 | 1/2004 | Jojic et al. | |
| 6,771,277 B2 | 8/2004 | Ohba | |
| 6,950,534 B2 | 9/2005 | Cohen et al. | |
| 7,003,134 B1 * | 2/2006 | Covell et al. | 382/103 |
| 7,006,236 B2 | 2/2006 | Tomasi et al. | |
| 7,050,177 B2 | 5/2006 | Tomasi et al. | |
| 7,085,409 B2 | 8/2006 | Sawhney | |

(Continued)

FOREIGN PATENT DOCUMENTS

WO    WO 99/15863 A1    4/1999
WO    WO 01/59975 A3    1/2002

(Continued)

OTHER PUBLICATIONS

D. DeCarlo and D. Metaxas. The integration of optical flow and deformable models with applications to human face shape and motion estimation. In Proceedings CVPR '96, pp. 231-238, 1996.*

(Continued)

*Primary Examiner* — Ulka Chauhan
*Assistant Examiner* — Sultana M Zalalee
(74) *Attorney, Agent, or Firm* — Gregg Wisdom; Judy Yee; Micky Minhas

(57) ABSTRACT

Techniques for efficiently tracking points on a depth map using an optical flow are disclosed. In order to optimize the use of optical flow, isolated regions of the depth map may be tracked. The sampling regions may comprise a 3-dimensional box (width, height and depth). Each region may be "colored" as a function of depth information to generate a "zebra" pattern as a function of depth data for each sample. The disclosed techniques may provide for handling optical flow tracking when occlusion occurs by utilizing a weighting process for application of optical flow vs. velocity prediction to stabilize tracking.

10 Claims, 13 Drawing Sheets

(56) References Cited

U.S. PATENT DOCUMENTS

| | | |
|---|---|---|
| 7,151,530 B2 | 12/2006 | Roeber et al. |
| 7,224,384 B1 | 5/2007 | Iddan et al. |
| 7,227,526 B2 | 6/2007 | Hildreth et al. |
| 7,293,356 B2 | 11/2007 | Sohn et al. |
| 7,308,112 B2 | 12/2007 | Fujimura et al. |
| 7,310,431 B2 | 12/2007 | Gokturk et al. |
| 7,317,836 B2 | 1/2008 | Fujimura et al. |
| 7,340,077 B2 | 3/2008 | Gokturk et al. |
| 7,372,977 B2 | 5/2008 | Fujimura |
| 7,590,262 B2 | 9/2009 | Fujimura et al. |
| 2002/0038456 A1 | 3/2002 | Hansen |
| 2004/0207597 A1 | 10/2004 | Marks |
| 2005/0059488 A1 | 3/2005 | Larsen et al. |
| 2006/0188144 A1 | 8/2006 | Sasaki et al. |
| 2006/0239558 A1 | 10/2006 | Rafii et al. |
| 2007/0013718 A1 | 1/2007 | Ohba |
| 2007/0038108 A1* | 2/2007 | Hao et al. ................ 600/454 |
| 2007/0060336 A1 | 3/2007 | Marks et al. |
| 2007/0098222 A1 | 5/2007 | Porter et al. |
| 2007/0216894 A1 | 9/2007 | Garcia et al. |
| 2007/0260984 A1 | 11/2007 | Marks et al. |
| 2007/0279485 A1 | 12/2007 | Ohba et al. |
| 2007/0283296 A1 | 12/2007 | Nilsson |
| 2007/0298882 A1 | 12/2007 | Marks et al. |
| 2008/0001951 A1 | 1/2008 | Marks et al. |
| 2008/0031492 A1* | 2/2008 | Lanz ........................ 382/103 |
| 2008/0037829 A1 | 2/2008 | Givon |
| 2008/0062257 A1 | 3/2008 | Corson |
| 2008/0100620 A1 | 5/2008 | Nagai et al. |
| 2008/0126937 A1 | 5/2008 | Pachet |
| 2008/0134102 A1 | 6/2008 | Movold et al. |
| 2008/0152191 A1 | 6/2008 | Fujimura et al. |
| 2008/0180439 A1* | 7/2008 | Adabala et al. ............ 345/421 |
| 2008/0215972 A1 | 9/2008 | Zalewski et al. |
| 2008/0215973 A1 | 9/2008 | Zalewski et al. |
| 2009/0141933 A1 | 6/2009 | Wagg |
| 2009/0167679 A1 | 7/2009 | Klier et al. |
| 2009/0221368 A1 | 9/2009 | Yen et al. |

FOREIGN PATENT DOCUMENTS

| | | |
|---|---|---|
| WO | WO 02/082249 A2 | 10/2002 |
| WO | WO 03/001722 A3 | 3/2003 |
| WO | WO 03/046706 A1 | 6/2003 |
| WO | WO 03/073359 A3 | 11/2003 |
| WO | WO 03/054683 A3 | 12/2003 |
| WO | WO 2003/071410 A3 | 3/2004 |
| WO | WO 2006/089417 A1 | 8/2006 |
| WO | WO 2006089417 A1 | 8/2006 |
| WO | WO 2009/059065 A1 | 5/2009 |

OTHER PUBLICATIONS

Ideses, I. et al., "Depth Map Manipulation for 3d Visualization", 3DTV-Con, May 28-30, 2008, 4 pages, http://ieeexplore.ieee.org.

Lucena, M. J. et al., "Probalistic Observation Models for Tracking Based on Optical Flow", LNCS, 2003, 2652, 462-469, 8 pages, http://ieeexplore.ieee.org.

Zhu, Y. et al., "3D Head Pose Estimation with Optical Flow and Depth Constraints", Proceedings of the 4th International Conference on 3-D Digital Imaging and Modeling, IEEE, 2003, 6 pages.

Ideses et al., "Depth Map Manipulation for 3D Visualization", 3DTV Conference on the True Vision—Capture, Transmission and Display of 3D Video, Tel-Aviv University Israel, 3DTV-CON'08, May 28-30, 2008, 337-340.

Lucena et al., "Probabilistic Observation Models for Tracking Based on Optical Flow", Pattern Recognition and Image Analysis, (no month available) 2003, 462-469.

Shivappa et al., "Person Tracking with Audio-Visual Cues Using Iterative Decoding Framework", IEEE Fifth International Conference on Advanced Video and Signal Based Surveillance, AVSS '08, Santa Fe, NM, Sep. 1-3, 2008, 260-267.

* cited by examiner

DEPTH MAP MOVEMENT TRACKING VIA OPTICAL FLOW AND VELOCITY PREDICTION

BACKGROUND

Optical flow algorithms (such as the Lucas-Kanade in Pyramids method), can be used on images to detect movement of pixels when compared to a second image. Optical flow refers to a pattern of apparent motion of objects, surfaces and edges caused by relative motion between an observer and scene. Optical flow can be applied to infer the motion of objects within a scene. Optical flow algorithms such as the Lucas-Kandae method may utilize the following constraint equation for a voxel at location $(x,y,z,t)$ with intensity $I(x,y,z,t)$:

$$I(x,y,z,t) = I(x+\delta x, y+\delta y, z+\delta z, t+\delta t)$$

Optical flow is designed to run against standard images (pictures, web cams, etc.) and is typically operable only on 2-D images.

It may be desirable to perform optical flow on other types of data such as a depth map. Depth maps are a colorless two-dimensional matrix of values representing distance away from a camera (i.e., there is no intensity information). For example, a depth map produced by a 3D depth camera consists of a matrix of values describing distance from the camera of every pixel in the scene. A common application of a depth map is for natural human input. This application requires a system to be able to track movement of interesting points on the subject (i.e., hands, head, etc.).

Furthermore, even if there were effective methods for performing optical flow on depth map data, occlusion in three-dimensional data raises additional technical challenges. Occlusion refers to one object passing in front of another such as a hand passing in front of a head. Because depth maps are restricted to a single camera's point of view, occlusion is likely and cannot be resolved utilizing alternate point(s) of view.

Thus, methods for performing optical flow on depth map data in order to track objects and/or points with dynamic behavior in those images are necessary.

SUMMARY

A method and system for efficiently tracking points on a depth map using an optical flow is described. The method and system takes advantage of two special properties of depth maps: 1) clean subject silhouettes in any light condition, and 2) area isolation using Z-values.

In order to optimize the use of optical flow, isolated regions of the depth map may be tracked. The sampling regions may comprise a 3-dimensional box (width, height and depth). This provides isolation of the trackable region as additional filtering can be done to eliminate data that is irrelevant to the point being tracked in all dimensions. A sub-region of the depth map (i.e., a "sample" box volume) including a point to be tracked may be isolated and "colored" in so as to enable optical flow to track it. As a body moves, these small regions have enough information in them for optical flow to determine the next position.

The "coloring" of each sample may be achieved by generating an alternating light/dark pattern referred to herein as a "zebra" pattern as a function of depth data for each sample. The zebra pattern produces hard edges that optical flow algorithms can easily detect. This "zebra" emerges as depth bands are either colored white or grey.

Velocity prediction may be utilized in conjunction with optical flow in order to handle obfuscation of regions as one region moves in front of another. A weighting scheme may be applied to determine how much emphasis to place on optical flow as opposed to velocity prediction. The weighting scheme may be driven by a confidence value for each region indicating the degree to which the region is obfuscated.

DETAILED DESCRIPTION OF ILLUSTRATIVE EMBODIMENTS

Figure 1A:
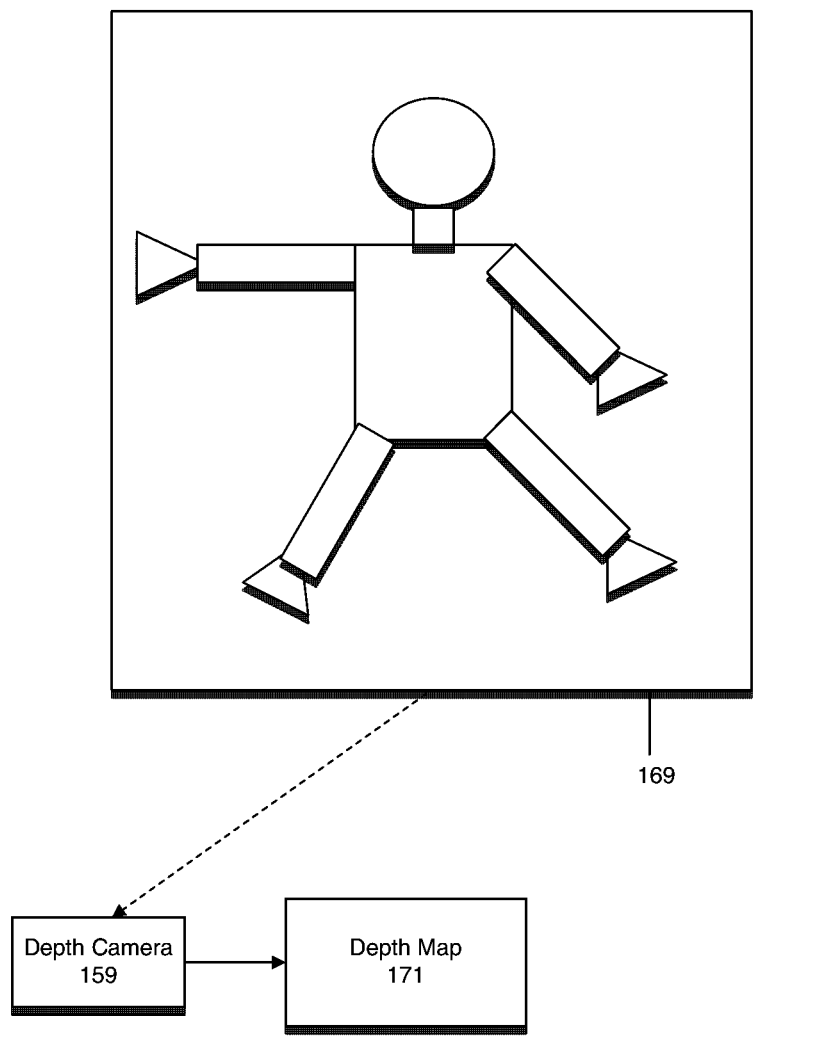
FIG. 1A depicts an exemplary operation of a depth camera.

FIG. 1A depicts an exemplary operation of a depth camera. Depth camera 159 receives depth information in scene 169 and generates depth map 171. Depth map 171 may be a matrix of values representing a distance or depth of points in scene 169 from depth camera 159. According to one embodiment, depth camera 159 may generate a plurality of frames, which comprise a time series of depth maps 171. Such a series of depth map may be used, for example, to track the movements of a computer and/or game console user in order to determine one or more user inputs from the user to the computer and/or game console.

Figure 1B:
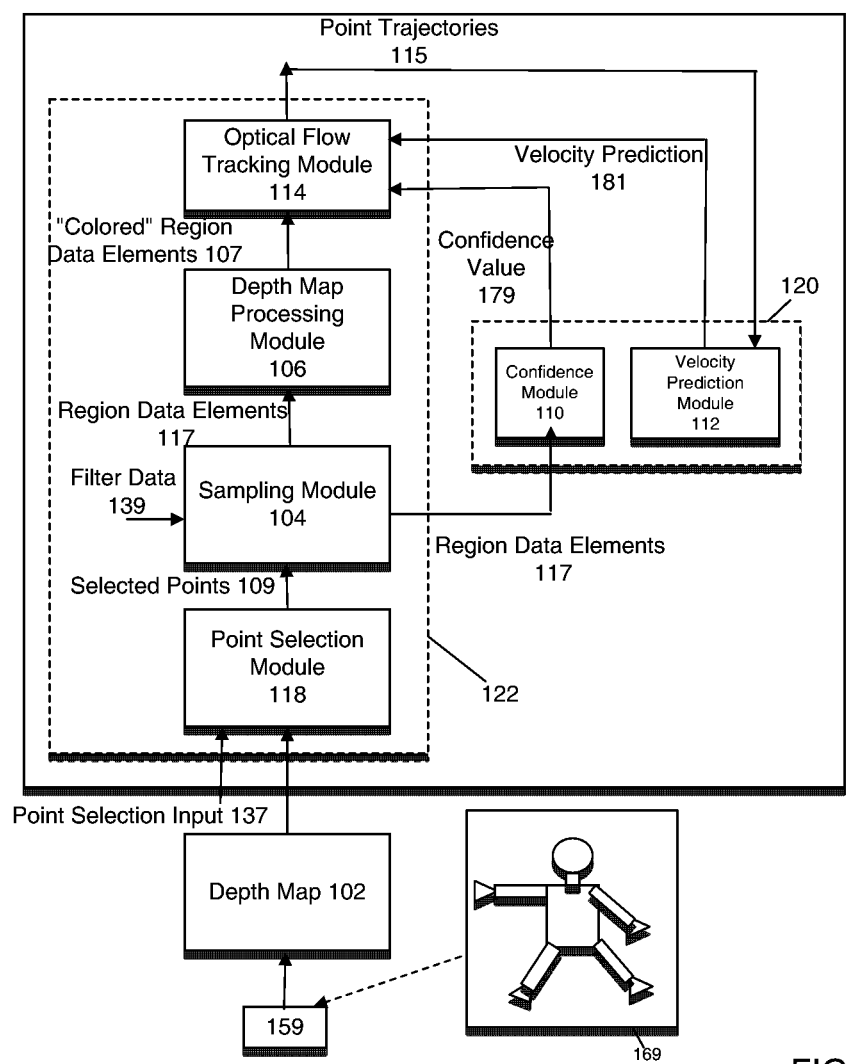
FIG. 1B shows a depth map optical flow processing system ("DMOFPS") according to one embodiment.

FIG. 1B shows a depth map optical flow processing system ("DMOFPS") according to one embodiment. DMOFPS 100 may comprise optical flow processing component 122 and velocity prediction component 120. Optical flow processing component 122 comprises point selection module 118, sampling module 104, depth map processing module 106 and optical flow tracking module 114. Depth camera 159 may generate depth map 102 from scene 169. According to one embodiment, depth map 102 is one in a time series of depth map frames, wherein each depth map 102 is indexed by a time value. Point selection module receives depth map 102 and point selection input 137. Depth map 102 may comprise a matrix of values, each value reflecting a depth of the respective point from a common reference point such as a depth camera.

According to one embodiment, optical flow processing component 122 may operate by generating a plurality of region data elements 117 from a received depth map 102. Each region data element may comprise a sample box volume containing a point to be tracked. Each region data element may represent an isolated and filtered portion of depth map 102. According to one embodiment, each region data element 117 may be "colored" in such a way to enable optical flow to track it. As a body moves, these small regions have enough information in them for optical flow to determine the next position. The size of the regions must be large enough to accommodate movement to the next frame.

Point selection input 137 may comprise one or more parameters indicated by a user (not shown in FIG. 1B) regarding points to be tracked via a depth map optical flow algorithm. Point selection module 118 may in turn output selected points 109, which are provided to sampling module 104.

Sampling module 104 may generate a region associated with a selected point for input to depth map processing module 106. According to one embodiment, sampling module 104 may also receive filter data 139, which specifies a three-dimensional region, which may be of any arbitrary shape. In particular, as described below, filter data 139 may comprise parameters indicating a three-dimensional region such as a box having length, width and depth. The depth parameter associated with the region may operate to filter depth map data beyond or outside the depth of the region.

Sampling module 104 may generate region data elements 117 reflecting the regions generated for each point in selected points 109. Region data elements 117 may comprise a plurality of depth map data matrices for each region as processed by sampling module 104 and filter data 139. Sampling module 104 may generate a plurality of region data elements 117, one associated with each point of selected points 109. Each region data element may comprise a matrix of depth map data associated with each received point. As noted, each region data element may reflect a filtered output of depth map values based upon received filter data 139.

Region data elements 117 may be received by depth map processing module 106, which may "color" each region. In particular, for each region data element received, depth map processing module 106 may generate a respective "colored" region data element 107, which comprises a second matrix of values for each region data element, wherein the second matrix of values is generated as a function of the depth map data associated with the received region data element. According to one embodiment, the processing or "coloring" of region data elements 117 is accomplished by assigning a respective gray scale as a function of each depth map value in the region. According to one embodiment, these "colored" regions may manifest themselves as "zebra" patterns. The term "zebra" pattern refers to the fact the "coloring" of each sample is achieved by generating an alternating light/dark pattern. The zebra pattern produces hard edges that optical flow algorithms can easily detect. This "zebra" emerges as depth bands are either colored white or grey (black means unknown or occluded).

DMOFPS may also comprise velocity prediction component 120, which may comprise velocity prediction module 112 and confidence module 110. Velocity prediction module 112 may receive point trajectories 115 generated by optical flow tracking module 114 and in turn may generate velocity prediction data 181 of selected points based upon recently known velocities and/or positions of respective points. Velocity prediction data 181 may be provided to optical flow tracking module 114 for use in performing an optical flow process as described in detail below.

Confidence module may receive region data elements 117 from sampling module 104 and in turn generate respective confidence values for respective regions. Confidence value 179 may be provided to optical flow tracking module 114 for use in performing an optical flow process as described in detail below. In particular, according to one embodiment, confidence module 110 may generate confidence value 179 for region data elements based upon depth statistics for each respective region. Confidence value 179 may indicate the degree to which optical flow may be successfully applied to a given region. Confidence values may reflect the degree to which it is believed that a region is obfuscated. According to one embodiment, confidence value 179 generated by confidence module 110 is a classification "good", "obfuscated" or "unknown", which respectively indicate whether a given region is not obfuscated, obfuscated or unknown.

Colored region data elements 107 may be received by optical flow tracking module 114. Optical flow tracking module 114 may perform optical flow tracking upon each of the colored regions 107 as a function of confidence value 179 and velocity prediction data respectively generated by confidence module 110 and velocity prediction module 112 in velocity prediction component 120 as described in detail below. Optical flow tracking module 114 may generate point trajectories 115, which represent trajectories or displacement vectors of selected points 109.

Figure 2:
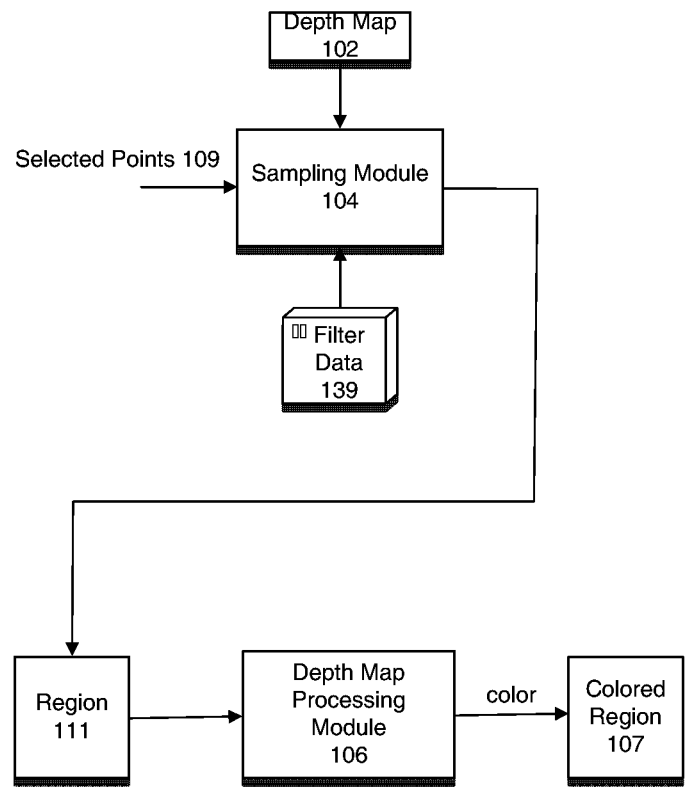
FIG. 2 illustrates an exemplary operation of a sampling module, which generates colored regions from depth map data and selected points.

FIG. 2 illustrates an exemplary operation of a sampling module, which generates colored regions from depth map data and selected points. Sampling module 104 may receive selected points 109, depth map data 102 and filter data 139. The nature of selected points 109 and depth map data 102 is described above with respect to FIG. 1B.

According to one embodiment filter data 139 may comprise parameters specifying a three-dimensional region, for example a box having length, width and depth. Sampling module may generate a region 111 of depth map data around respective selected points 109 as a function of filter data 139. For example, according to one embodiment, sampling module generates each region 111 as a two-dimensional array of depth map data surrounding a received selected point 109 using a box region provided by filter data 139. According to this same embodiment, the length and width parameters of the box specify the length and width of the region in the two-dimensional space of the depth map. According to one embodiment, data values in region 111 values outside of the "depth zone" of the box may be set to a constant value such as 0, which will be treated similarly by depth map processing module 106 (e.g., coloring the depth values outside of the depth zone black).

The depth dimension of the box may effectively operate to filter depth map data 102 outside of the depth of the box. This filtering operation provides significant benefit for optical flow processing because optical flow operates on two-dimensional data and in order to track a particular object such as a human hand, it may assumed over some finite time interval that the object to track moves primarily in the X-Y dimensions and little in the Z dimension. This filtering operation thus allows for isolation of particular objects within a depth zone over a finite time period.

Region data 111 may be received by depth map processing module 106, which may effectively "color" each received region. Depth map processing module 106 may generate a colored region 107 for each received region 111. Each colored region 107 may comprise a two-dimensional matrix of data values, which reflect a one-to-one mapping of data values in a respective region 111. According to one embodiment, depth map processing module 106 may generate a grayscale value for each depth map value in a particular region. The mapping between depth map values and grayscale values is arbitrary. The mapping may be linear or nonlinear over the range of possible grayscale values.

According to one embodiment, these "colored" regions may manifest themselves as "zebra" patterns 107. The term "zebra" pattern refers to the fact the "coloring" of each sample, is achieved by generating an alternating light/dark pattern. The zebra pattern produces hard edges that optical flow algorithms can easily detect. This "zebra" emerges as depth bands are either colored white or grey (black means unknown or occluded).

Figure 3A:
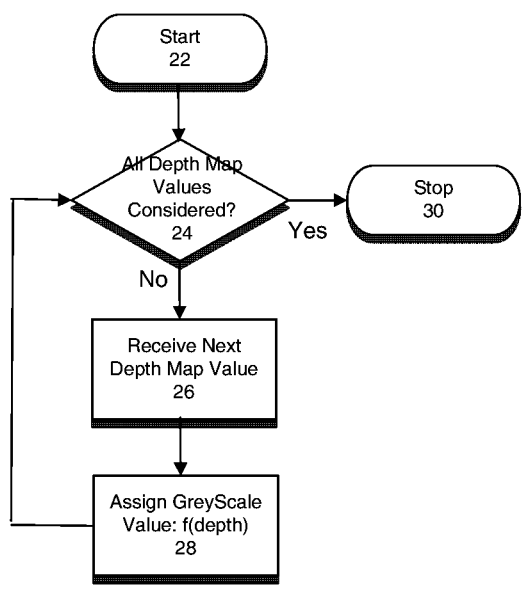
FIG. 3A is a flowchart illustrating an exemplary process for generating colored data from depth map data.

FIG. 3A is a flowchart illustrating an exemplary process for generating colored data from depth map data. According to one embodiment, the process shown in FIG. 3A may be performed by a depth map processing module as shown in FIG. 1B. It is assumed that the process may operate on a depth map of an entire scene or a region 111 generated by sampling module 104. The process is initiated in 22. In 24, it is determined whether all depth map values in the scene or region have been considered. If so ('Yes' Branch of 24), flow continues with 30 and the process ends. If not ('No' branch of 24), flow continues with 26 and a next depth map value from the scene or region is received. In 28 a grayscale value is assigned to the depth map value 26 received in 26 using a linear or non-linear operation as described with respect to FIG. 2.

Figure 3B:
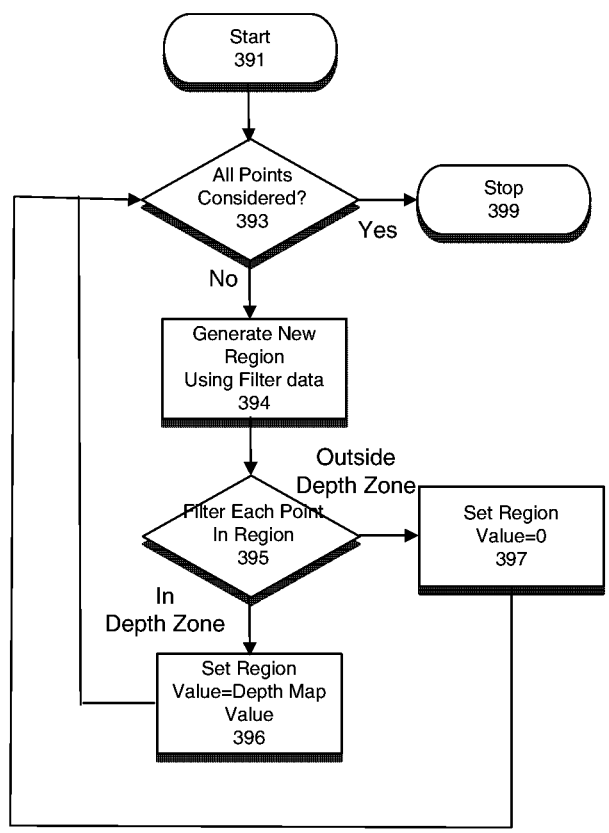
FIG. 3B is a flowchart illustrating an exemplary process for generating one or more regions from depth map data.

FIG. 3B is a flowchart illustrating an exemplary process for generating one or more regions from depth map data. According to one embodiment, the process shown in FIG. 3B may be performed by a sampling module 104 module as shown in FIG. 1B. It is assumed that the process may operate on a depth map of an entire scene or a region 111 and selected point data 109 by point selection module 118. The process is initiated in 391. In 393, it is determined whether all points in point data 109 have been considered. If so ('Yes' Branch of 393), flow continues with 399 and the process ends. If not ('No' branch of 393), flow continues with 394 and a new region corresponding to a current point is generated. According to one embodiment a region is generated from a current point as a function of filter data 139, which may comprise parameters specifying a three-dimensional box, which is specifies an area around the current point defining the region. The depth value of the box may be used to filter depth values outside of the depth zone. In particular, in 395, filter data 139 is applied to each point in the region. For each point, if the point is outside the depth zone of the region, the region value is set to 0 in 397. Otherwise, in 396 the region value is set to the depth map value for the point. Flow then continues with 393.

Figure 3C:
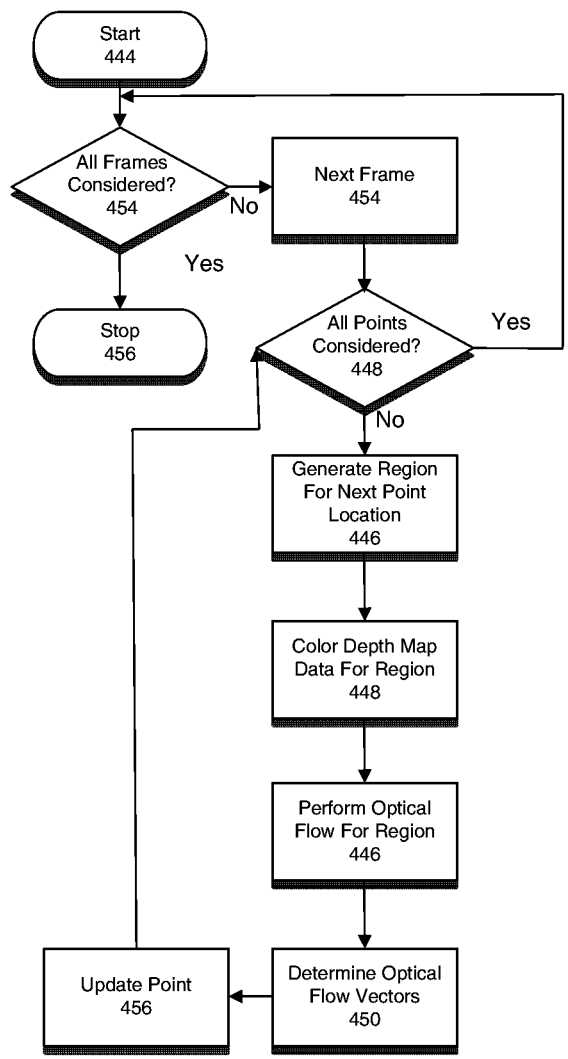
FIG. 3C is a flowchart illustrating an exemplary process for performing optical flow using depth map data according to one embodiment.

FIG. 3C is a flowchart illustrating an exemplary process for performing optical flow using depth map data according to one embodiment. According to one embodiment, optical flow may be performed on each isolated region using only "colored" depth map data for that region. Optical flow vectors may be generated for the point associated with the region by performing optical flow on the region and the location of the point is updated. A region is then generated using the filter data 139 around the updated point, the region colored and the process repeated to track the point over a successive set of time frames. In other words, according to one embodiment, the sampling box associated with a point is moved in conjunction with the point as it is tracked.

According to one embodiment, the process shown in FIG. 3C may be performed by an optical flow tracking module 114 as shown in FIG. 1B. The process shown in FIG. 3C does not utilize input from velocity prediction component 120. An exemplary process utilizing input from velocity component 120 is shown and described with respect to FIG. 3E.

The process is initiated in 444. In 454 it is determined whether all frames (i.e. all depth maps 102 in a time series) have been considered. If so ('yes' branch of 454), flow continues with 456 and the process ends. If not ('no' branch of 454) flow continues with 455 and the next frame is considered. In 445 it is determined whether all points in the current frame have been considered. If so ('yes' branch of 445), flow continues with 454. If not ('no branch of 445) flow continues with 446 and a new region is generated by sampling module 104 from the current point. In 448 the generated region is "colored" by depth map processing module 106.

In 449, optical flow is performed on the current region using a known optical flow process such as the Lucas-Kandae method. In particular, in 449 optical flow is performed on a isolated region using only "colored" depth map data for that region. In 450, optical flow vectors generated by the application of optical flow are determined for the current region. In 451, an updated point is determined using the optical flow vectors generated in 450. Flow then continues with 445.

Figure 3D:
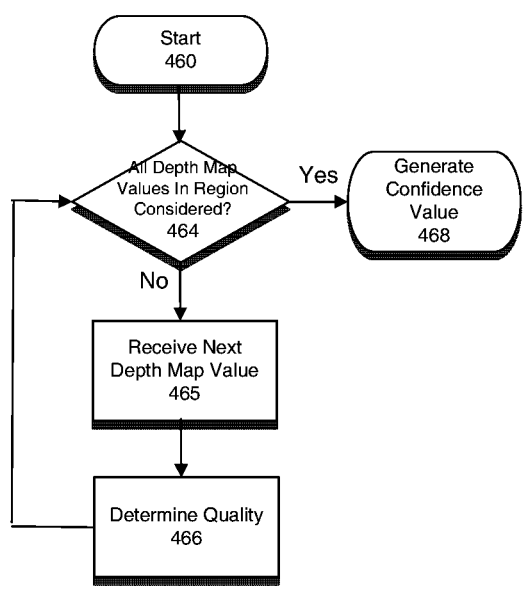
FIG. 3D is a flowchart of an exemplary process for computing a confidence value according to one embodiment.

FIG. 3D is a flowchart of an exemplary process for computing a confidence value according to one embodiment. According to one embodiment, confidence value 179 is a floating point value between 0-1, where 1 indicates 100% confidence. Confidence value 179 may be generated by a confidence module 110 as shown in FIG. 1B. The process is initiated in 460. According to one embodiment, confidence value 179 may be generated for each region to determine the suitability of applying optical flow to the region. In 464, it is determined whether all depth map values in the region have been considered. If so ('yes' branch of 464), flow continues with 468 and the process generates a computed confidence value 179 based upon iteration over the region. Otherwise ('no' branch of 464) flow continues with 465 and the next depth map value in the region is considered. In 466, a quality value is calculated for the current depth map value. The quality value may indicate "good", "obfuscated" or "unknown" based upon whether the current point is obfuscated or not. In order to determine the quality value with respect to obfuscation, confidence module 110 may rely upon the location of other tracked points and their associated regions. Flow then continue with 464.

According to one embodiment, the more "good" values and less "obfuscated"/"unknown" the more optical flow is applicable to the region in its current location. The confidence value represents how well optical flow works against the sample provided. The following pseudo-code illustrates an exemplary operation of confidence module 110.

```
int area = (_box.Extent.X * _box.Extent.Y) / 2;
    float goodVsArea   = min((float)stats.Good / (float)area, 1.0f);
float goodVsOccluded = 1.0f – min((float)stats.Occluded /
(float)stats.Good, 1.0f);
    float confidence = (0.5f * goodVsArea) + (0.5f * goodVsOccluded);
```

According to one embodiment velocity prediction module 112 may perform velocity prediction on a point that is being tracked by optical flow tracking module 114. Velocity flow prediction module may operate using any known algorithm for performing velocity prediction such as using the most recent velocity values computed. According to one embodiment, to ensure samples don't "fly off" in cases of many successive low confidence samples, a constant velocity tapering factor is applied. The following is pseudo-code for implementing a velocity prediction by a velocity prediction module 112 according to one embodiment.

```
// Find new velocity as described by flow.
//
Vector3 newVelocity;
newVelocity.Set(flowX – _box.Position.X, flowY – _box.Position.Y,
flowZ – box.Position.Z).
```

According to one embodiment, optical flow tracking module 114 may perform optical flow on each colored region data element 107 as a function of received velocity prediction data 181 and confidence value 179 respectively received by velocity prediction module 112 and confidence module 110. Optical flow tracking module 114 may perform a weighting based upon the value output by confidence module 110 to determine how much emphasis to provide to optical flow tracking vs. velocity prediction. The following is pseudo-code for an exemplary weighting process.

```
// Prediction.
//
// Predict next position by using confidence value to weight how much
// past velocity (last Calibrate-Track pair) should be applied to
result of flow.
//
// Tracked prediction Velocity constantly tapers off. Meaning, the more
// consecutive use of non-confident values, the more it tapers off until it
// reaches zero (90% falloff).
//
newVelocity.X = Round((newVelocity.X * confidence) + (_velocity.X *
(1.0f – confidence)));
newVelocity.Y = Round((newVelocity.Y * confidence) + (_velocity.Y *
(1.0f – confidence)));
newVelocity.Z = Round((newVelocity.Z * confidence) + (_velocity.Z *
(1.0f – confidence)));
// Track velocity for next track.
_velocity.Set((int)(newVelocity.X * 0.9f), (int)(newVelocity.Y *
0.9f), (int)(newVelocity.Z * 0.9f)).
```

Figure 3E:
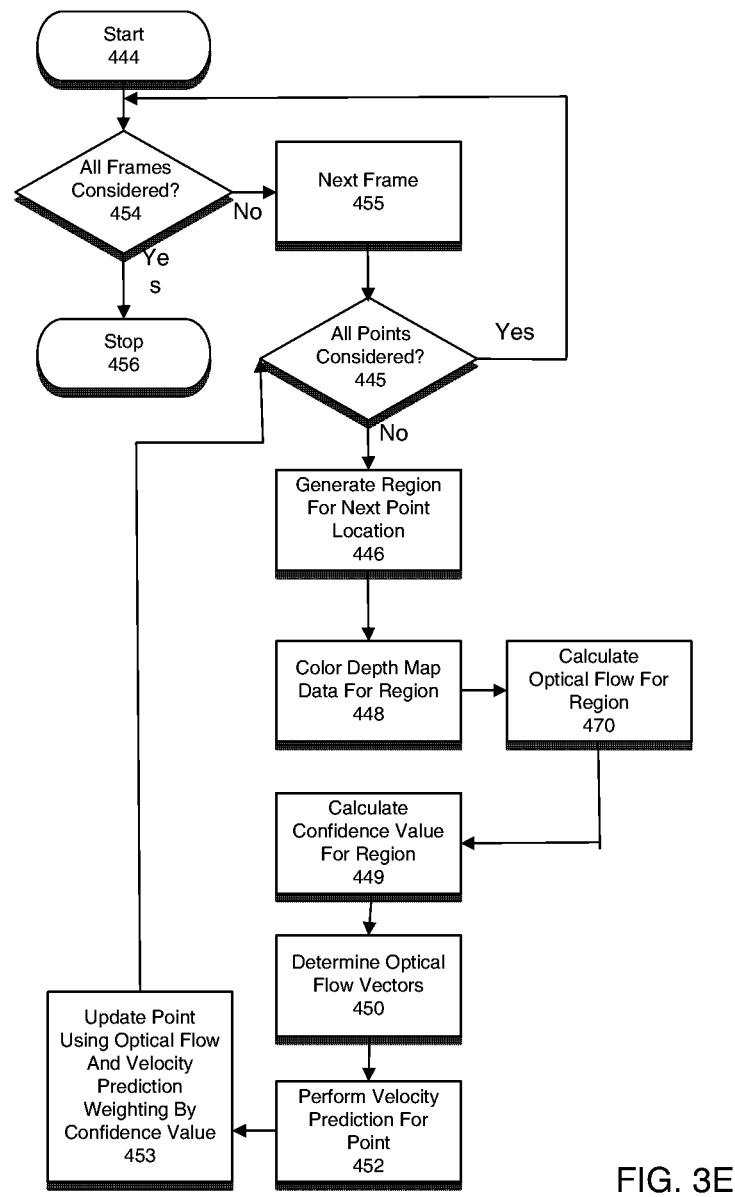
FIG. 3E is a flowchart illustrating an exemplary process for performing optical flow using depth map data utilizing input from a velocity tracking component according to one embodiment.

FIG. 3E is a flowchart illustrating a process for performing optical flow using depth map data utilizing input from a velocity tracking component according to one embodiment. According to one embodiment, optical flow may be performed on each isolated region using only "colored" depth map data for that region. Optical flow vectors may be generated for the point associated with the region by performing optical flow on the region and the location of the point is updated. A region is then generated using the filter data 139 around the updated point, the region colored and the process repeated to track the point over a successive set of time frames. In other words, according to one embodiment, the sampling box associated with a point is moved in conjunction with the point as it is tracked.

According to one embodiment, the process shown in FIG. 3E may be performed by an optical flow tracking module 114 as shown in FIG. 1B. The process shown in FIG. 3E utilizes input from velocity prediction component 120.

The process is initiated in 444. In 454 it is determined whether all frames (i.e. all depth maps 102 in a time series) have been considered. If so ('yes' branch of 454), flow continues with 456 and the process ends. If not ('no' branch of 454) flow continues with 455 and the next frame is considered. In 445 it is determined whether all points in the current frame have been considered. If so ('yes' branch of 445), flow continues with 454. If not ('no branch of 445) flow continues with 446 and a new region is generated by sampling module 104 from the current point. In 448 the generated region is "colored" by depth map processing module 106. In 470, optical flow is performed on the current region using a known optical flow process such as the Lucas-Kandae method. Optical flow may be performed on an isolated region using only "colored" depth map data for that region.

In 449, confidence value 179 is computed for the current "colored" region 107. In 450, optical flow vectors generated by the application of optical flow are determined for the current region. In 452, velocity prediction may be performed for the current point as described above. In 453, an updated point location for the current region is performed using a weighting based upon confidence value 179 value output by confidence module 110, velocity prediction data 181 and optical flow vectors using a weighting scheme such as the exemplary weighting scheme described above. Flow then continues with 445.

Figure 4A:
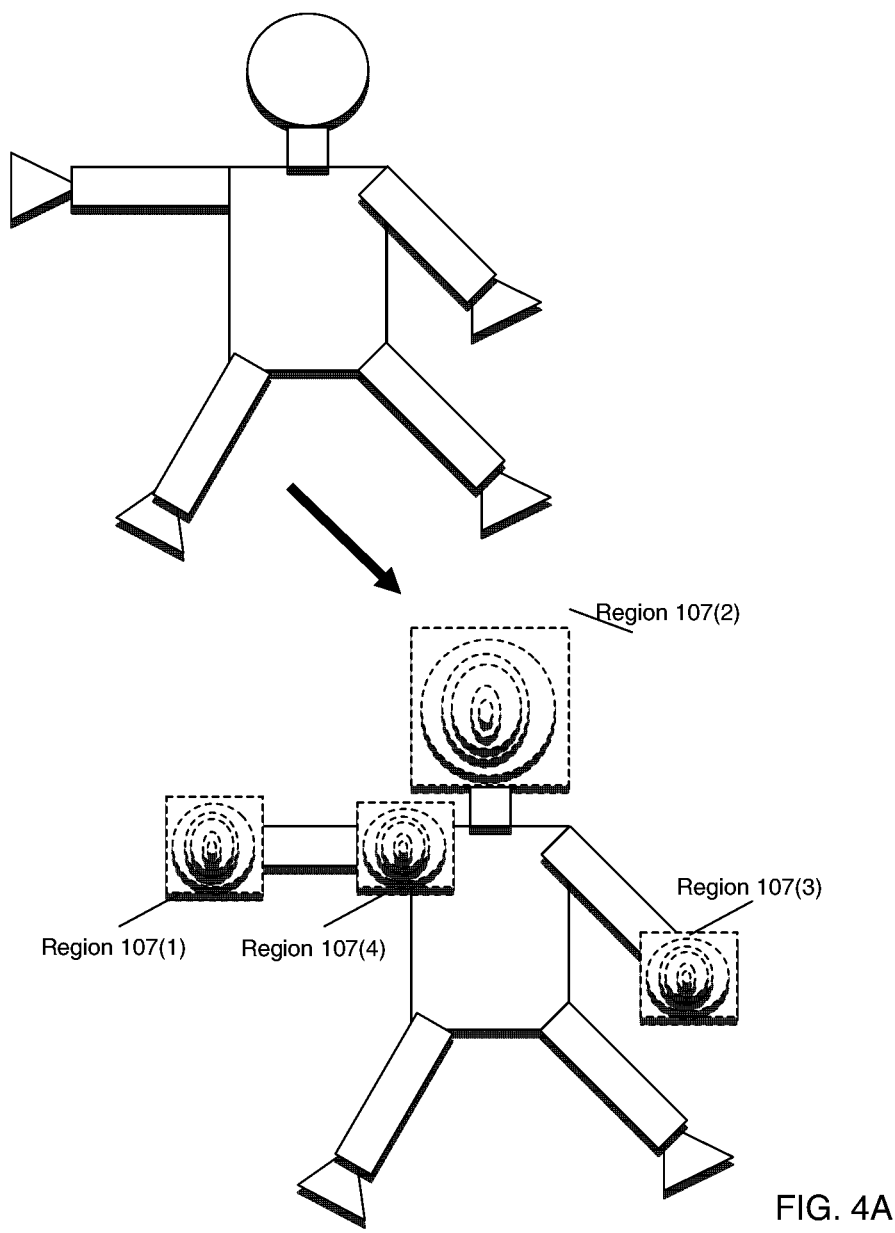
FIG. 4A graphically illustrates an exemplary generation of colored regions for scene data.

FIG. 4A graphically illustrates an exemplary generation of colored regions for scene data. As shown in FIG. 4A, colored region data elements 107 may be generated for head region 107(2), left hand region 107(3), shoulder region 107(4) and right hand region 107(1). Colored region data elements 107 may manifest as the zebra patterns described above. These zebra patterns facilitate the performance of optical flow due to the sharp contrast and banding attributes of the pattern.

Figure 4B:
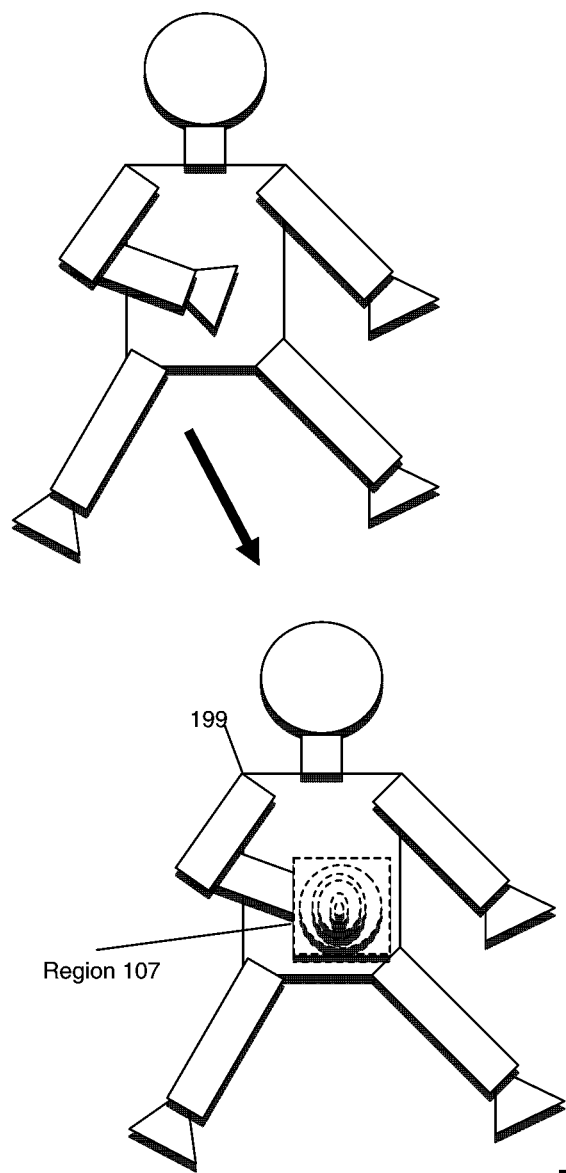
FIG. 4B graphically illustrates an exemplary obfuscation scenario and operation of filter data.

FIG. 4B graphically illustrates an exemplary obfuscation scenario and operation of filter data. As shown in FIG. 4B, colored region data 107 corresponding to a hand may overlap and/or obfuscate data in the depth map 102 for torso 199. According to this example, it is desired only to track hand region 107 and thus filter data 179 may be utilized to set the depth zone for region 107 only to capture values up to a certain depth, thereby causing filtering of torso 199 depth data values.

Figure 4C:
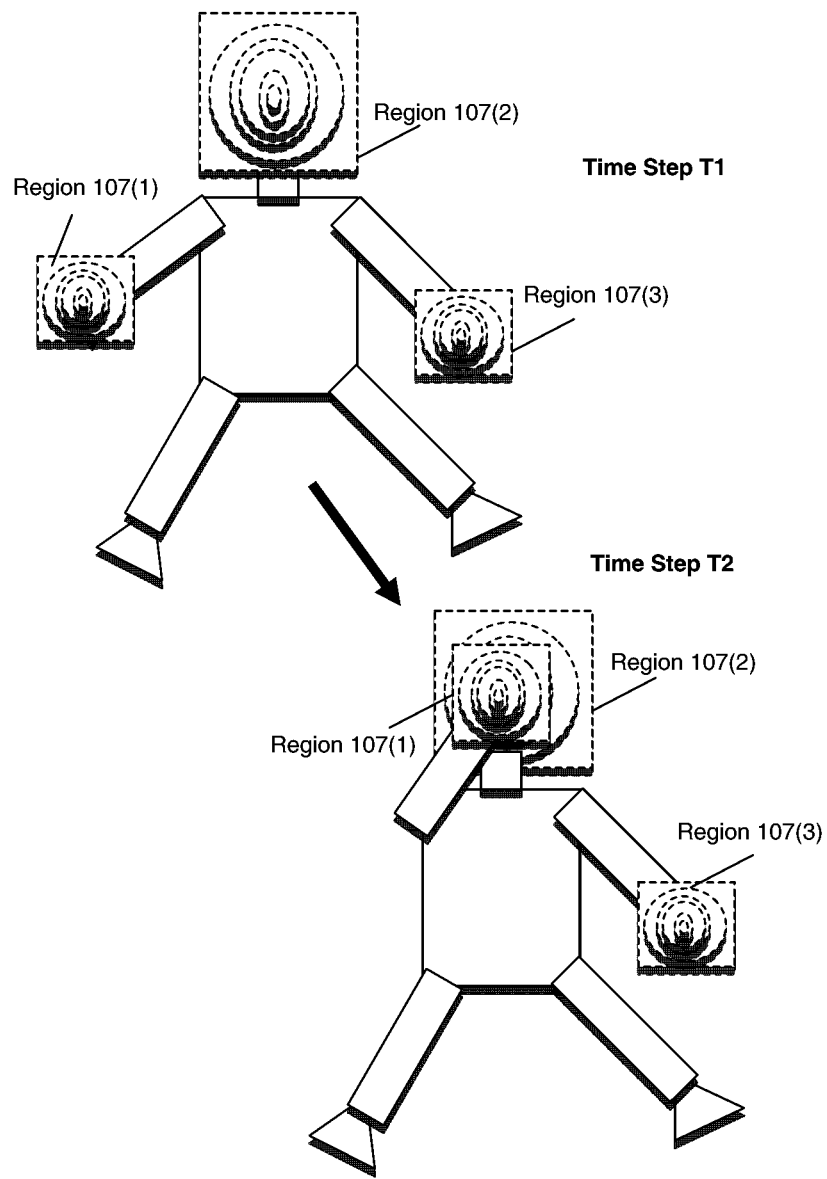
FIG. 4C graphically illustrates another exemplary obfuscation scenario and operation of filter data.

FIG. 4C graphically illustrates another exemplary obfuscation scenario and operation of filter data. As shown in FIG. 4C, it is assumed that right hand region 107(1), head region 107(2) and left hand region 107(3) are being tracked. In time step T1, no regions are obfuscated and the weighting of velocity prediction data for head region 107(2) would be low. However, in time step T2, hand region 107(1) is obfuscating head region 107(2) because the hand has moved and the weighting for velocity prediction of head region 107(2) would be increased to rely more heavily on velocity prediction rather than optical flow for head region 107(2).

The system, methods and components of the depth map movement tracking architecture described herein may be embodied in a multi-media console, such as a gaming console, or in any other computing device in which it is desired to recognize gestures of a user for purposes of user input, including, by way of example and without any intended limitation, satellite receivers, set top boxes, arcade games, personal computers (PCs), portable telephones, personal digital assistants (PDAs), and other hand-held devices.

Figure 5:
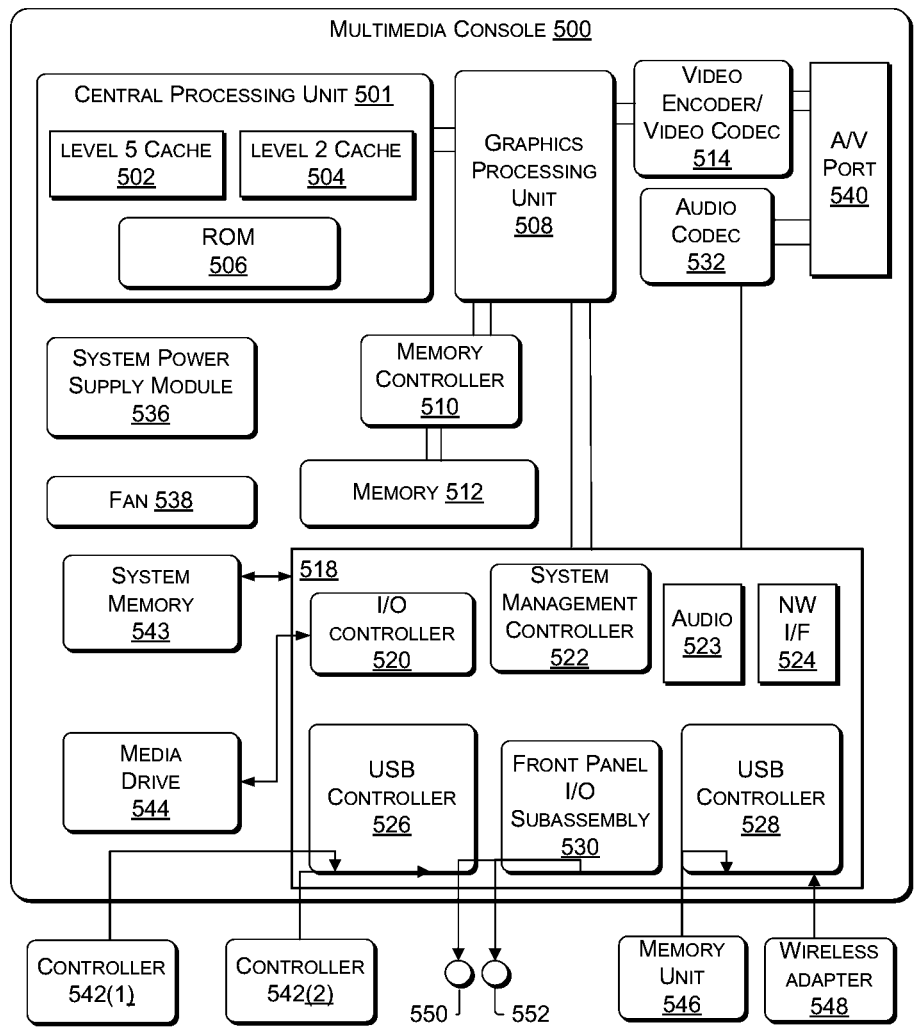
FIG. 5 illustrates an exemplary multi-media gaming computing environment in which in which the depth map movement tracking architecture described herein may be embodied.

FIG. 5 is a block diagram of one example of a multimedia console 500, such as a gaming console, in which the depth map movement tracking architecture described herein may be embodied. The multimedia console 500 has a central processing unit (CPU) 501 having a level 1 cache 502, a level 2 cache 504, and a flash ROM (Read Only Memory) 506. The level 1 cache 502 and a level 2 cache 504 temporarily store data and hence reduce the number of memory access cycles, thereby improving processing speed and throughput. The CPU 501 may be provided having more than one core, and thus, additional level 1 and level 2 caches 502 and 504. The flash ROM 506 may store executable code that is loaded during an initial phase of a boot process when the multimedia console 500 is powered ON.

A graphics processing unit (GPU) 508 and a video encoder/video codec (coder/decoder) 514 form a video processing pipeline for high speed and high resolution graphics processing. Data is carried from the graphics processing unit 508 to the video encoder/video codec 514 via a bus. The video processing pipeline outputs data to an A/V (audio/video) port 540 for transmission to a television or other display. A memory controller 510 is connected to the GPU 508 to facilitate processor access to various types of memory 512, such as, but not limited to, a RAM (Random Access Memory).

The multimedia console 500 includes an I/O controller 520, a system management controller 522, an audio processing unit 523, a network interface controller 524, a first USB host controller 526, a second USB controller 528 and a front panel I/O subassembly 530 that are preferably implemented on a module 518. The USB controllers 526 and 528 serve as hosts for peripheral controllers 542(1)-542(2), a wireless adapter 148, and an external memory device 546 (e.g., flash memory, external CD/DVD ROM drive, removable media, etc.). The network interface 124 and/or wireless adapter 548 provide access to a network (e.g., the Internet, home network, etc.) and may be any of a wide variety of various wired or wireless adapter components including an Ethernet card, a modem, a Bluetooth module, a cable modem, and the like.

System memory 543 is provided to store application data that is loaded during the boot process. A media drive 544 is provided and may comprise a DVD/CD drive, hard drive, or other removable media drive, etc. The media drive 544 may be internal or external to the multimedia console 500. Application data may be accessed via the media drive 544 for execution, playback, etc. by the multimedia console 500. The media drive 544 is connected to the I/O controller 520 via a bus, such as a Serial ATA bus or other high speed connection (e.g., IEEE 1394).

The system management controller 522 provides a variety of service functions related to assuring availability of the multimedia console 500. The audio processing unit 523 and an audio codec 532 form a corresponding audio processing pipeline with high fidelity and stereo processing. Audio data is carried between the audio processing unit 523 and the audio codec 532 via a communication link. The audio processing pipeline outputs data to the A/V port 540 for reproduction by an external audio player or device having audio capabilities.

The front panel I/O subassembly 530 supports the functionality of the power button 550 and the eject button 552, as well as any LEDs (light emitting diodes) or other indicators exposed on the outer surface of the multimedia console 500. A system power supply module 536 provides power to the components of the multimedia console 500. A fan 538 cools the circuitry within the multimedia console 500.

The CPU 501, GPU 508, memory controller 510, and various other components within the multimedia console 500 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 500 is powered ON, application data may be loaded from the system memory 543 into memory 512 and/or caches 502, 504 and executed on the CPU 501. The application may present a graphical user interface that provides a consistent user experience when navigating to different media types available on the multimedia console 500. In operation, applications and/or other media contained within the media drive 544 may be launched or played from the media drive 544 to provide additional functionalities to the multimedia console 500.

The multimedia console 500 may be operated as a standalone system by simply connecting the system to a television or other display. In this standalone mode, the multimedia console 500 allows one or more users to interact with the system, watch movies, or listen to music. However, with the integration of broadband connectivity made available through the network interface 524 or the wireless adapter 548, the multimedia console 500 may further be operated as a participant in a larger network community.

When the multimedia console 500 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 500 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 501 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 542(1) and 542(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches.

Figure 6:
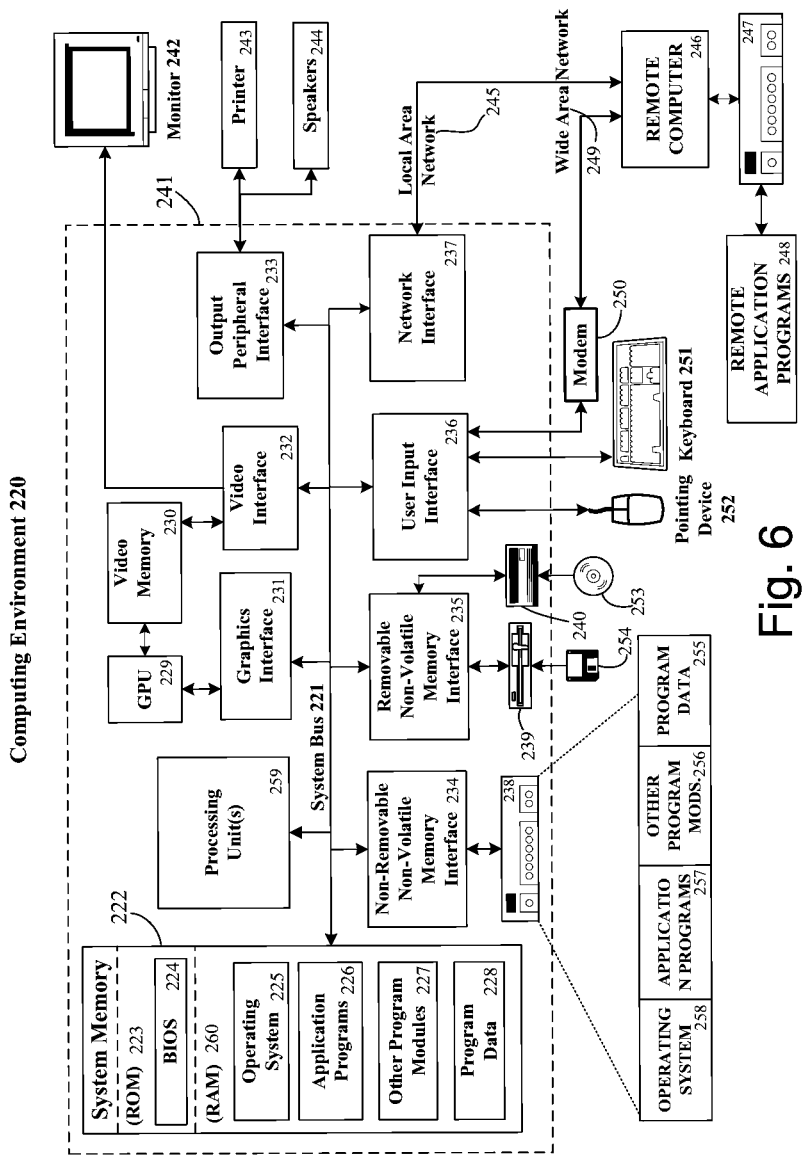
FIG. 6 illustrates an exemplary general purpose computing environment in which in which the depth map movement tracking architecture described herein may be embodied.

As another example, FIG. 6 is a block diagram of a general purpose computing device in which the depth map movement tracking architecture described herein may be employed.

Numerous embodiments of the present disclosure may execute on a computer. For example, the computer executable instructions that carry out the processes and methods for providing PC experiences on gaming consoles may reside and/or be executed in such a computing environment as shown in FIG. 5. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computer 241 typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 6 illustrates operating system 225, application programs 226, other program modules 227, and program data 228.

The computer 241 may also include other removable/non-removable, volatile/nonvolatile computer storage media. By way of example only, FIG. 6 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 6, provide storage of computer readable instructions, data structures, program modules and other data for the computer 241. In FIG. 6, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 6. The logical connections depicted in FIG. 6 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 6 illustrates remote application programs 248 as residing on memory device 247. It will be appreciated that the network connections shown are exemplary and other means of establishing a communications link between the computers may be used.

What is claimed:

1. A method for performing optical flow on a depth map comprising a selected point and a second point, each point indicating a depth value, the method comprising:

determining region comprising the selected and second points;

processing the region by assigning a grayscale value to each point as a function of each point's associated depth value;

processing the region using an optical flow algorithm to determine optical flow vectors for the region;

performing a velocity prediction of the selected point;

analyzing the region to determine an amount of occlusion of the region;

determining a new location for the selected point based on a weighting of the optical flow vectors for the region and the velocity prediction, the weighting being based on the determined amount of occlusion in the region such that a relative weight given to the velocity prediction and a relative weight given to the optical flow vectors depends on the determined amount of occlusion, and the weight given to the velocity prediction is increased relative to the weight given to the optical flow vectors as the determined amount of occlusion increases; and setting the location of the selected point to the new location.

2. The method of claim 1, wherein the region comprises a three-dimensional volume oriented around the selected point.

3. The method of claim 2, wherein the three-dimensional volume filters out points beyond a selected depth.

4. The method of claim 1, wherein the optical flow algorithm is the Lucas-Kanade algorithm.

5. A computer-readable storage device storing optical flow bearing computer-executable instructions used for performing a process for determining user input to a computer that, when executed on the computer, cause the computer to perform operations comprising:

receiving depth map data representing positions of a computer user with respect to a depth camera;

determining an associated region comprising a selected point and a second point in the depth map;

determining a grayscale value for the selected and second points based on a respective depth value of that point;

performing optical flow on the depth map data to determine optical flow vectors for the region;

performing a velocity prediction of the selected point;

analyzing the region to determine an amount of occlusion of the region;

determining a new location for the selected point based on a weighting of the optical flow vectors for the associated region and the velocity prediction, the weighting being based on the determined amount of occlusion in the associated region, and the weight given to the velocity prediction is increased relative to the weight given to the optical flow vectors as the determined amount of occlusion increases;

setting the location of the selected point to the new location; and determining a user input to the computer based on the new location of the selected point.

6. The computer-readable storage device of claim 5, wherein the computer is a game console.

7. The computer-readable storage device of claim 5, wherein the user is a video game player.

8. The computer-readable storage device of claim 5, wherein the region comprises a three-dimensional volume oriented around the respective selected point.

9. A system for performing optical flow on depth map data comprising a selected point, comprising:

a processor; and a memory communicatively coupled to the processor when the system is operational, the memory bearing processor-executable instructions that, when executed on the processor, cause the system at least to:

determine an associated region comprising the selected and second points;

process the region by assigning a grayscale value to each point as a function of each point's associated depth value;

process the region using an optical flow algorithm to determine optical flow vectors for the region;

perform a velocity prediction of the selected point;

analyze the region to determine an amount of occlusion of the region;

determine a new location for the selected point based on a weighting of the optical flow vectors for the associated region and the velocity prediction, the weighting being based on the determined amount of occlusion in the associated region, and the weight given to the velocity prediction is increased relative to the weight given to the optical flow vectors as the determined amount of occlusion increases; and set the location of the selected point to the new location.

10. The system of claim 9, wherein the optical flow algorithm is the Lucas-Kanade algorithm.

* * * * *